July 21, 1953
G. L. BROWN ET AL
2,645,817
PROCESS FOR FINISHING RECLAIM RUBBER
Filed Sept. 22, 1950
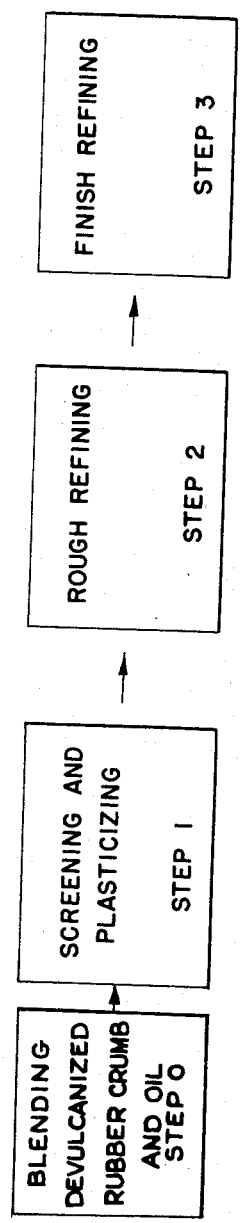
INVENTORS
GARDNER L. BROWN
BY THEODORE A. JOHNSON
ATTORNEY

UNITED STATES PATENT OFFICE 2,645,817

PROCESS FOR FINISHING RECLAIM RUBBER

Gardner L. Brown and Theodore A. Johnson, Akron, Ohio, assignors to Wingfoot Corporation, Akron, Ohio, a corporation of Delaware Application September 22, 1950, Serial No. 186,198

10 Claims. (Cl. 18—47.5)

This invention relates to improvements in a process for reclaiming scrap rubber, and has particular reference to a process for finishing devulcanized rubber. As used in the reclaiming field, "finishing" refers to the final plasticization and sheeting steps after the scrap is devulcanized and dried.

The commercial method of finishing scrap rubber after it has been devulcanized and defiberized comprises the successive steps of (1) passing through an apron mill where the softened rubber is sheared from the hard core, the rubber is masticated into an adherent mass, and processing oil is added, (2) passing through a rough refiner set with an opening between the rolls of .007 to .009 inch whereby the rubber is further softened and particle sizes reduced, (3) passing through a strainer whereby extraneous matter is removed, and (4) passing through a finish refiner set with an opening between the rolls of about .005 inch whereby non-acceptable material is removed as tailings, final plasticization is accomplished and the thin sheet is rolled onto a carrier preparatory to slabbing off for use.

It has long been a problem in the reclaiming of scrap rubber to remove foreign matter prior to running through machines, such as refiners, where small pieces of metal and other hard objects may injure rolls which, as indicated above, are set close together. Magnetic separation prior to devulcanization removes the larger metal pieces, but has not proved to be a complete answer to this problem as evidenced by the presence of substantial foreign bodies within the rubber particles after devulcanization.

Attempts to put the finishing of reclaim scrap on an assembly line basis have also proved impractical because of the necessity of working the rubber repeatedly on the mills and consequently delaying its forward progress until the proper degree of plasticization is attained.

It is an object of this invention to provide a process of finishing which removes substantially all extraneous matter from devulcanized rubber prior to refining.

It is another object of this invention to blend, smear and grind tough devulcanized rubber particles to a substantially uniform consistency by screening in a rubber strainer.

It is a further object of this invention to evolve a process wherein a continuous uninterrupted assembly line operation is practical in the finishing of devulcanized rubber.

Another and still further object is the provision of a method whereby a substantial increase in production is obtained and a substantial reduction in operating expense is effected.

Other objects and advantages will become apparent as the description proceeds.

In practicing the invention, the scrap rubber can be prepared for finishing according to the customary methods, for example, by removing the beads from scrap tires, shredding the scrap, digesting by any of the usual methods such as alkali, acid or neutral processes, and drying the resultant pellets.

The advantage of my process is illustrated in the accompanying drawing, in which the figure is a flow chart showing the improved method of this invention.

The apron mill employed in the performance of the first step of the customary finishing process is a standard piece of equipment in the rubber reclaiming industry. It is a customary milling machine with two rolls, 22 inches in diameter and 60 or 84 inches long, rotating at different speeds, i. e. 20 R. P. M. on the back roll and 16.6 R. P. M. on the front roll. When these horizontal rolls are operated with a clearance of about one-half inch, the dried devulcanized, defiberized crumbs of rubber can be masticated and blended thereon with processing oils. A continuous endless belt type apron passes under the rolls and up the back in substantially concentric relation to the back roll, thus gathering up the crumbs which have been crushed between the rolls and running them between the rolls again and again. When the milling operation of the first step is completed, the devulcanized rubber is still not a completely cohesive mass.

The product of the first step is next subjected to rough refining. Rough refiners are conventional milling machines, usually with two horizontal rolls 24 and 20 inches, respectively, in diameter and 30 inches long, usually rotated at a speed ratio of 2.52:1 with a clearance of .006 to .009 inch. In this step the rubber is further masticated and blended into a cohesive sheet which still contains some hard particles.

The sole function of screening, the third step in the conventional process, is to remove small bits of foreign matter such as metal, stones, glass or other hard objects. The strainer equipment employed in the screening operation is a standard piece of rubber machinery. The devulcanized scrap rubber from the rough refiner is fed directly into the strainer. A motor driven horizontal auger propels the rubber forward with increasing pressure until the rubber is forced through a screen having a mesh of about 18 to 30 apertures per square inch.

Customarily, the rubber is then finish refined in a fourth step by masticating with a refiner substantially identical to that employed in the second step except that the rolls are set at about .005 inch clearance.

In practicing this invention, as illustrated by the flow sheet, the strainer, in addition to removing foreign objects, is used to masticate and blend the devulcanized crumbs and to add plasticizing oils and compounds as the first step in the finishing process. About 5 per cent of processing oil, based on the weight of the rubber, is generally added to increase shelf life and aging properties of the finished reclaim, but the addition of oil is not essential to operation of the invention. An example of such an oil is a still bottom oil which has a specific gravity of .973 at 60° F., a flash point of 420° F., fires at 470° F., and has a Stormer viscosity of 9 R. P. M. at 25° C. A wide range of oils, from thin to quite viscous, has been successfully employed.

Other compounds, such as pigments or non-staining inhibitors, can be added during this first step. Such additions should be employed to an extent less than 10 per cent of the weight of the rubber in order to prevent excessive plugging of the screen in the strainer.

This screening step makes possible the removal of substantially all of the extraneous material prior to refining and thus eliminates a constant source of refiner roll damage. By using the conventional strainer in this manner, a rubber that is tackier, smoother, better blended, and having fewer hard particles is obtained. In particularly tough devulcanized reclaim, such as alkali-digested tread stock, a second pass through the strainer can be made to increase the plasticity.

The strainer used for this process may be of any standard type, but the following design items are of importance. It is preferred that the discharge end be of the open type as distinguished from the barrel head type. Thus, screen changing is accomplished much faster because all that is necessary is to release the supporting frame and peel off the screen. Clamp type head closure is preferred to the lug type because the latter allows leakage of stock. The screw and barrel should have a cooling means in order to control the generated heat. The operating temperature ranges from about 180° F. to 240° F. A "flared head" screw, one that flares out at the end to substantially fill the conical formation of the head interior, increases the screening rate. If the screw is split into a double thread, better distribution of stock and pressure to the screen surface is obtained with the elimination of stagnant areas.

The commercial strainer used to screen and plasticize employs a motor, which is usually one developing from 50 to 125 hp., to actuate a screw. The screw can be about 12 inches in diameter, and is usually operated at about 20 to 35 R. P. M. The screen is placed over the exit and is usually about 10 to 20 inches in diameter.

The next step in practicing the invention, as shown in the drawing, is that of rough refining. This is accomplished in a conventional milling machine having two horizontal rolls, 20 and 40 inches, respectively, in diameter and 30 inches long. Speed of rotation of the front roll is 16.6 R. P. M. and that of the rear roll is 33.3 R. P. M. The rolls can be set with an opening of .006 to .009 inch.

While the apparatus and its mode of operation in the above described step of the process of the present invention is essentially similar to that employed in the second step of the conventional as previously indicated, the results obtained thereby differ widely from those achieved by the conventional process. The basis for this phenomenon is the fact that the rubber entering the rough refiner which has been through the screening step is in plastic condition and has the foreign matter removed. Thus the step is more in the nature of the final step of the conventional process.

It is even possible to omit step 2 when reclaiming certain stock, such as tube stock and air bag stock. When used in this manner, the invention becomes a two-step process.

The third and final step of the process of the invention as indicated in the flow sheet involves further milling in a machine similar to that of the previous step with the rolls set at .0045 to .005 inch. The rubber, after milling, is removed to a winder in a thin continuous sheet and rolled until slab thickness of about two inches is obtained. A few hard particles, amounting to about 10 to 15 per cent of the total rubber content, drop out as tailings and then routed back to be remilled or to be devulcanized again. The function of this step is to effect final plasticization, to remove the tailings, and wind the rubber preparatory to slabbing. The rolled rubber is then cut off in slabs, dusted with soapstone to prevent adherence, and stacked preparatory to use.

In practicing the invention, conveyors can be used to convey the rubber from the strainer plasticizer to the rough refiner, and from the rough refiner to the finish refiner.

The invention can be practiced with a simple mixing step, such as carried out in a Struther-Wells mixer, to uniformly blend the oil and stock before it enters the strainer plasticizer. This mixing step shown as step O of the drawing, while not essential to the performance of the several basic steps of the process of the invention, is, nevertheless, advantageous in that it affords a somewhat more uniform distribution of the processing oils to produce a film on the devulcanized crumbs of rubber, and to evenly distribute any added compounds.

The practice of the invention is best illustrated by the following representative examples:

*Example 1*

Five hundred pounds of regular scrap containing unknown portions of natural and synthetic rubber devulcanized and defiberized by means of an alkali digestion was strained through a screen 8½ inches in diameter containing 30 apertures per square inch. The screening rate was 28 pounds per minute and a temperature of 255° F. was developed. The screened rubber was then run through the rough and finish milling operation. A final reclaim was obtained which had more tack, better shelf life, processed easier, and had fewer tailings than that obtained by the conventional process.

*Example 2*

Ten thousand pounds of regular scrap devulcanized and defiberized by means of a "neutral" digestion was strained through a screen 10 inches in diameter with apertures of about .023 inch in diameter. The rate was 66 pounds per minute, and a temperature of 210° F. was developed. The rubber was then rough and finish refined. Results comparable to the above were obtained.

In practicing the invention, the type of scrap to be finished makes no difference. It may be any proportion of natural and synthetic rubbers, devulcanized and defiberized in any of the conventional ways.

The size of the batch is immaterial, as is the screening rate. Rates of 29 to 85 pounds per minute have been successfully employed. However, the screen aperture must be kept small in order to get the proper amount of plasticization. A clamp-on flared head has given the best results because it allows easy access to the screen, but does not permit leakage of stock. The interior temperature of the strainer is not critical. A range of 195° F. to 255° F. has been employed in practicing the invention.

The term "rubber" is used herein to include natural rubber, and the various synthetic rubbers, such as alkylene rubbers, polychloroprene, polyisobutylene, butyl rubber; the rubbery copolymers of butadiene and styrene; and the rubbery copolymers of butadiene and acrylonitrile. The term "devulcanized rubber" is used herein to include any rubber which has been digested in any form of internal or steam jacketed digester by any process, for example, by an acid, an alkali, or a neutral process.

While certain representative embodiments and details have been shown for the purpose of illustrating the invention, it will be apparent to those skilled in this art that various changes and modifications may be made therein without departing from the spirit or scope of the invention.

We claim:

1. In the reclaiming of vulcanized scrap rubber the method of finishing devulcanized rubber which comprises passing crumbs of unmilled devulcanized rubber from the devulcanizer and drier directly through a strainer to partially masticate and remove extraneous matter therefrom and then passing the strained rubber through a refiner to complete the mastication.

2. In the reclaiming of vulcanized scrap rubber the method of finishing devulcanized rubber which comprises passing crumbs of unmilled devulcanized rubber from the devulcanizer and drier directly through a strainer to partially masticate and remove extraneous matter therefrom and then passing the strained rubber through a refiner to complete the mastication and to form the same into a uniform sheet.

3. In the reclaiming of vulcanized scrap rubber the method of finishing devulcanized rubber which comprises passing crumbs of unmilled devulcanized rubber from the devulcanizer and drier directly through a strainer to partially masticate and remove extraneous matter therefrom and then passing the strained rubber through successive refining operations to further masticate said rubber and to form the same into a uniform sheet.

4. In the reclaiming of vulcanized scrap rubber the method of finishing devulcanized rubber which comprises passing crumbs of unmilled devulcanized rubber from the devulcanizer and drier directly through a strainer to partially masticate and remove extraneous matter therefrom and then passing the strained rubber through a first refining operation to further masticate the rubber and subjecting the product of the first refining operation to a second refining operation to produce a uniform sheet stock.

5. In the reclaiming of vulcanized scrap rubber the method of finishing unmilled devulcanized rubber crumbs which comprises the successive steps of blending said devulcanized rubber crumbs with oil, passing the devulcanized rubber crumbs and oil directly to a strainer without intervening operations, forcing the same through a strainer to partially masticate and remove extraneous matter therefrom and then passing the strained rubber through a refiner to complete the mastication.

6. In the reclaiming of vulcanized scrap rubber the method of finishing unmilled devulcanized rubber crumbs which comprises the successive steps of blending said devulcanized rubber crumbs with oil, passing the devulcanized rubber crumbs and oil directly to a strainer without intervening operations, forcing the same through said strainer to partially masticate and remove extraneous matter therefrom and then passing the strained rubber through a refiner to complete the mastication and to form the same into a uniform sheet.

7. In the reclaiming of vulcanized scrap rubber the method of finishing unmilled devulcanized rubber crumbs which comprises the successive steps of blending said devulcanized rubber crumbs with oil, passing the devulcanized rubber crumbs and oil directly to a strainer without intervening operations, forcing the same through said strainer to partially masticate and remove extraneous matter therefrom and then passing the strained rubber through successive refining operations to further masticate said rubber and to form the same into a uniform sheet.

8. In the reclaiming of vulcanized scrap rubber the method of finishing unmilled devulcanized rubber crumbs which comprises the successive steps of blending said devulcanized rubber crumbs with oil, passing the devulcanized rubber crumbs and oil directly to a strainer without intervening operations, forcing the same through said strainer to partially masticate and remove extraneous matter therefrom and then passing the strained rubber through a first refining operation to further masticate the rubber and subjecting the product of the first refining operation to a second refining operation to produce a uniform sheet stock.

9. In the reclaiming of vulcanized scrap rubber the method of finishing unmilled devulcanized rubber crumbs which comprises the successive steps of blending said devulcanized rubber crumbs with oil, passing the devulcanized rubber crumbs and oil directly to a strainer without intervening operations, forcing the same through said strainer to partially masticate and remove extraneous matter therefrom and then passing the strained rubber through a first refining operation until substantially homogeneous and sheetable at a gauge of .006 inch to .009 inch and subjecting the product of the first refining operation to a second refining operation until said rubber is sheetable at a gauge of .005 inch.

10. In the reclaiming of vulcanized scrap rubber the method of finishing unmilled devulcanized rubber crumbs which comprises the successive steps of blending said rubber crumbs with oil in a rotary blender, transporting said rubber crumbs and oil mixture by conveyor means directly to a strainer plasticizer, passing said mixture through said strainer plasticizer in order to remove extraneous matter therefrom and to partially masticate said rubber, transporting said partially masticated rubber by conveyor means to a refiner and passing said rubber through said refiner to complete the mastication and to form the same into a uniform sheet.

GARDNER L. BROWN.
THEODORE A. JOHNSON.

References Cited in the file of this patent

UNITED STATES PATENTS

| Number | Name | Date |
|---|---|---|
| 2,021,961 | McFarlane | Nov. 26, 1935 |
| 2,215,435 | Hale | Sept. 17, 1940 |
| 2,326,927 | Conrad | Aug. 17, 1943 |
| 2,459,745 | Waters | Jan. 18, 1949 |
| 2,471,392 | Campbell | May 24, 1949 |
| 2,524,375 | Campbell | Oct. 3, 1950 |

OTHER REFERENCES

"Rubber-Reclamation," Electrical Review, July 21, 1944, pp. 76–80.